(12) United States Patent
McConnell et al.

(10) Patent No.: US 10,783,076 B1
(45) Date of Patent: *Sep. 22, 2020

(54) REVISING CACHE EXPIRATION

(71) Applicant: United Services Automobile Association (USAA), San Antonio, TX (US)

(72) Inventors: Noah McConnell, San Antonio, TX (US); Kevin Paterson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/253,781

(22) Filed: Jan. 22, 2019

Related U.S. Application Data

(63) Continuation of application No. 14/019,316, filed on Sep. 5, 2013, now Pat. No. 10,216,631.

(51) Int. Cl.
  *G06F 12/00* (2006.01)
  *G06F 12/0808* (2016.01)

(52) U.S. Cl.
  CPC .............................. *G06F 12/0808* (2013.01)

(58) Field of Classification Search
  CPC .............. G06F 12/123; G06F 12/0808; G06F 12/0811; G06F 12/30902; H04L 67/2852
  See application file for complete search history.

(56) References Cited

U.S. PATENT DOCUMENTS

| | | | |
|---|---|---|---|
| 6,772,203 B1 | 8/2004 | Feiertag | |
| 8,219,752 B1 | 7/2012 | Jenkins | |
| 8,543,702 B1 | 9/2013 | Marshall | |
| 2002/0184448 A1* | 12/2002 | Cherkasova | G06F 12/122 711/133 |
| 2004/0015414 A1 | 1/2004 | Sidlo | |
| 2006/0036901 A1 | 2/2006 | Yang | |
| 2007/0277010 A1 | 11/2007 | Anand | |
| 2008/0229025 A1 | 9/2008 | Plannondon | |
| 2012/0117030 A1 | 5/2012 | Sakuma | |
| 2013/0073809 A1* | 3/2013 | Antani | G06F 12/121 711/136 |
| 2014/0068196 A1 | 3/2014 | Benoit | |
| 2014/0173134 A1 | 6/2014 | Choquette et al. | |

* cited by examiner

*Primary Examiner* — Arvind Talukdar
(74) *Attorney, Agent, or Firm* — Fish & Richardson P.C.

(57) ABSTRACT

Methods, systems, and computer-readable and executable medium embodiments for revising cache expiration are described herein. One method for revising cache expiration includes tracking attributes of a number of queries of a database; identifying a storage database is outside a database threshold in response to a write operation against the database and based on the tracked attributes; and revising a cache expiration date for at least one query of the number of queries to bring the storage database to within the database threshold.

20 Claims, 4 Drawing Sheets

330

| QUERY DEFINITIONS | | |
|---|---|---|
| QUERY NAME — 332 | TRAFFIC/DAY | EXPIRATION |
| ▶AAC_STREAM | 56 | 1 DAY ▼ —338 |
| ▶AWC_SERVERGROUPS | 283 | DISABLED |
| ▶AGENTHIGHRISKCI | 17 | 1 HOUR |
| ▶APPLICATIONAPPLICATION_RELATIONSHIPS | 2 | 4 HOURS |
| | | 1 DAY |
| ▶APPLICATIONARCHITECTS | 351 | 3 DAYS |
| ▶APPLICATIONBUSINESSCAPABILITIES | 164 | 1 WEEK |

| QUERY NAME | EXPIRATION | DATA |
|---|---|---|
| ACC_STREAM | 1 DAY | <...> |
| AWC_SERVERGROUPS | 1 HOUR | <...> |
| AGENTHIGHRISKCI | 3 DAYS | <...> |
| APPLICATIONAPPLICATION_RELATIONSHIPS | THIRTY MINUTES | <...> |
| APPLICATIONARCHITECTS | 1 WEEK | <...> |
| APPLICATIONBUSINESSCAPABILITIES | 1 DAY | <...> |

REVISING CACHE EXPIRATION

CROSS-REFERENCE TO RELATED APPLICATION

This application is a continuation application of and claims priority to U.S. application Ser. No. 14/019,316, filed on Sep. 5, 2013, the entirety of which is incorporated by reference into the present disclosure.

TECHNICAL FIELD

The present disclosure relates to methods and system for revising cache expiration.

BACKGROUND

Distributed applications (e.g., web applications) can be used by entities to implement business processes. In some instances, a service provider can provide a variety of distributed applications to a variety of customers (e.g., entities and/or clients). Such distributed application can be a factor in the operation success of the entity. As such, the service provider may have an interest in ensuring that the distributed applications operate properly and efficiently for their customers (e.g., the entities and/or clients).

BRIEF DESCRIPTION OF THE DRAWINGS

FIGS. 3A-3B illustrates an example of a display on a user interface according to one or more embodiments of the present disclosure.

DETAILED DESCRIPTION

Figure 1:
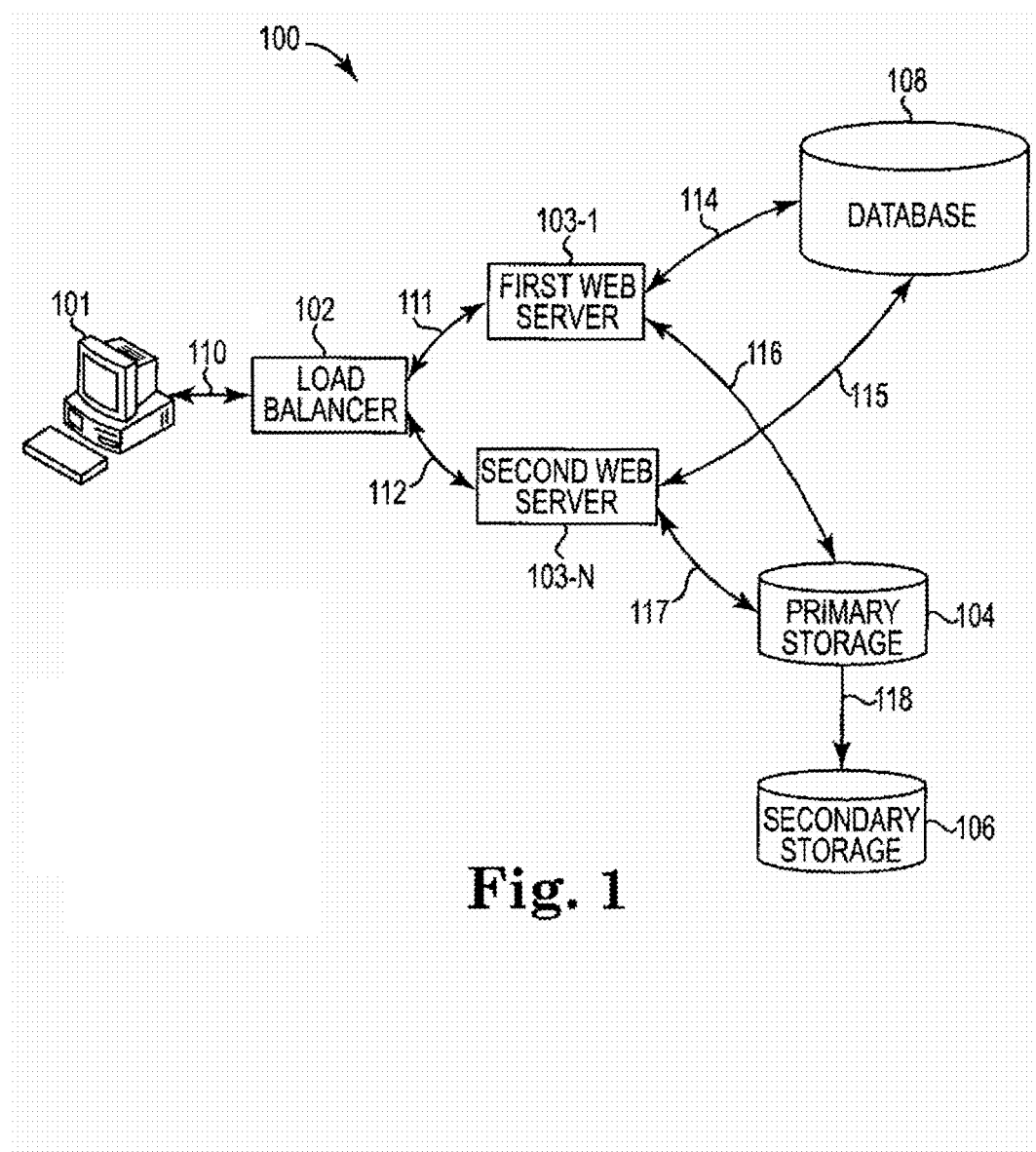
FIG. 1 illustrates a block diagram of an example of an environment according to one or more embodiments of the present disclosure.

The present disclosure provides method, system, and computer readable medium embodiments for revising cache expiration. This can be accomplished through analyzing attributes of re-caching operations of impacted queries of a database to identify historical trends of a number of queries of the database.

Current technology has allowed distributed applications (e.g., web applications) to have increasing capabilities. A distributed application, as used herein, can include an application (e.g., computer-readable instructions) that is executed on multiple machines (e.g., a client and a server) in a network. For instance, distributed applications can use client side code, have dynamic content, and/or the content can reach the distributed application from the client in a number of different ways. For example, content can reach the distributed application using hypertext transfer protocol (HTTP), such as using push technology, and/or asynchronous JavaScript and extensible markup language (AJAX) calls. The distributed applications can, for example, provide standardized data manipulation through the infrastructure of the network (e.g., database and/or server) including a thread pool and a cache store.

A cache store can include a system that transparently stores data so that a future request for the data can be served faster. For instance, a cache store can include a block of memory for temporary storage (e.g., such as CPU's, hard drives, and servers). In some instances, a service provider providing a variety of distributed applications can utilize one or more database servers that can each contain a plurality of database instances. A database server can include hardware components and/or computer-readable instruction components that provide database services to other computer programs and/or computing devices. A database can include an organized collection of data located in memory space. In contrast, a database instance can include a complete database environment including computer-readable instructions, table structure, stored procedures, and/or other functionality and/or structure.

A single database server can, for example, contain over twenty database instances. One or more of the database instances can include a storage database instance (herein referred to as "storage database"). The storage database, as used herein, can be used as a cache store for thread pooling and storing query definitions and results (e.g., thereby, the cache store contained on a storage database, as used herein, may not be stored in memory).

One or more of the storage databases can include primary storage databases. A primary storage database, as used herein, can include an active cache store that a user (e.g., a client) can access and perform read and write operations against it (e.g., can receive un-expired data from the cache store). In some instances, a separate server in the network can contain a secondary storage database. A secondary storage database can include a passive cache store that can contain a replicated and/or mirrored copy of data contained in the active cache store.

The database server containing the primary storage database can include an active server and the database server containing the secondary storage database can include a passive server, in various instances. If the active server has an error and/or malfunctions, the passive server can become the active server and the user can access the passive server (e.g., now an active server). A particular database server can have different roles for different distributed applications. For instance, a first database server can include an active server for a first distributed application and can include a passive server for a second distributed application.

Using a primary storage database and a secondary storage database for a distributed application can assist in high availability (HA) and/or data recovery (DR). For instance, the secondary storage database can, in some examples, be used for load balancing, reducing input/output (I/O) load on the primary storage database, and/or can be accessed for read and/or write operations if access to the primary storage database is interrupted.

A user (e.g., a client) can receive data from the primary storage database through a web server. For instance, the user can request a query of a database associated with the distributed application (e.g., a database storing data associated with the distributed application). If a cache expiration date associated with the query has expired, the web server can retrieve data associated with the query from the database and save the data to the primary storage database (e.g., refresh the data in the cache store in the primary storage database). The data associated with the query can include, for instance, data for a critical process and/or application. The saved data can be returned to the user and the primary storage database can update the secondary storage database with the retrieved data. Thereby, data updated in the primary storage database can be replicated and/or mirrored at the secondary storage database.

However, in some instances, the write operations associated with saving the data to the primary storage database and the secondary storage database can result in performance issues when distributed applications go into peak usage. For example, write operations against a particular database instance can result in a database threshold being reached. A database threshold can include, but is not limited to, an amount of write operations a storage database can perform in a period of time (e.g., write pages per hour). If a database threshold has been reached (e.g., the number of write pages per hour has been surpassed), users of the distributed application can be impacted due to failure and/or malfunctioning of the storage database. Further, because the database server can contain a number of storage databases and/or other database instances, the impact may spread to other storage databases resulting in impact to a variety of distributed applications.

In contrast, revising cache expiration, in accordance with one or more embodiments of the present disclosure, can include tracking attributes of a number of queries of a database to determine historical trends in write operations of re-caching data associated with each of the number of queries, patterns of updated data in the database (e.g., patterns of write operations against the database), and/or patterns in receiving requests for the number of queries. Based on the attributes tracked, it can be identified that a database threshold may be reached.

As an example, based on the tracked attributes, it may be determined that a distributed application goes into peak usage for write operations for (e.g., against) a storage database at 2 p.m. (e.g., in response to write operations against the database). A cache expiration date for at least one of the number of queries can be revised to bring the storage database to within the database threshold. For instance, it may be determined that query A of the database occurs every day at 1 a.m. The cache expiration date for query A can be revised to occur outside the peak usage time of 2 p.m. but prior to the determined query request time of 1 a.m.

By revising cache expiration dates of queries based on tracked attributes of queries, the service provider can balance near real-time data against ensuring high availability. The balance can be achieved by intelligently revising cache expiration dates to have data prepared ahead of time balanced against a number of write operations against a cache store. The intelligent adjustment can occur automatically, in various instances, when a database threshold is reached and/or in response to analyzed attributes. Such a system can tie network traffic, requests, and generated database load levels together with intelligent re-caching to automatically optimize the balance between them for high availability.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. As used herein, "a" or "a number of" something can refer to one or more such things. For example, "a number of objects" can refer to one or more objects. Additionally, the designator "N", as used herein, particularly with respect to reference numerals in the drawings, indicate that a number of the particular feature so designated can be included with a number of embodiments of the present disclosure.

FIG. 1 illustrates a block diagram of an example of an environment 100 according to one or more embodiments of the present disclosure. The environment 100 can, for example, be used to identify trends in re-caching data associated with a number of queries of a database 108.

The environment 100, as illustrated in FIG. 1, can include a database 108, a primary storage database 104, a secondary storage database 106, and/or one or more users. The database 108 can be associated with a distributed application. A database associated with a distributed application can include, for instance, a database containing data associated with the distributed application. The database 108, in one or more embodiments, can include a configuration management database (CMBD), a Structured Query Language (SQL) database, and/or distributed databases, among other databases. A query, in various instances, can include a query encoded in Topology Query Language (TQL).

The primary storage database 104 and/or the secondary storage database 106 can contain thread pool data (e.g., data on currently running threads in a thread pool managed by a web server) and a cache store. The primary storage database 104 can be used as a cache store for thread pool data and storing query definitions and results.

The thread pool data and the cache store contained on the secondary storage database 106 can include a synchronized and/or mirrored version of the thread pool data and cache store contained on the primary storage database 104. Mirroring and/or synchronization of data between the primary storage database 104 and the secondary storage database 106 can occur via a communication path 118 (e.g., as discussed further herein). Thereby, the data contained on the primary storage database 104 and/or the secondary storage database 106 can include data for critical processes and/or applications (e.g., query definitions and results).

A thread pool, as used herein, can include a number of threads created to perform a number of tasks. A web server (e.g., first web server 103-1 and/or second web server 103-N) can manage the thread pool contained on the primary storage database 104.

The one or more users can query the database 108 for data using a computing device 101. Example computing devices can include a desktop computer, laptop, a tablet, a smartphone, among other computing devices. For instance, the user can access a distributed application over a network to perform one or more actions (e.g., generate reports, access data, run a test, etc.)

For example, a user can send a request to query the database 108. The request can be sent via a communication path 110 in the environment 100 (e.g., a network) from a computing device 101 associated with the user to a web server (e.g., first web server 103-1 and/or second web server 103-N). Such a request can be referred to as a "hit on a web service".

In various embodiments, as illustrated in FIG. 1, the request can be sent to a load balancer 102. As an example, a user can come to a single web domain. The web domain can route to a number of web servers (e.g., first web server 103-1 and second web server 103-N). The load balancer 102 can sit between the user and the number of web servers 103-1 . . . 103-N. A load balancer 102, as used herein, can include hardware components and/or computer-readable instruction components operable to balance loads in an environment 100. For instance, the load balancer 102 can send a first sub-set of requests from a number of users to a first web server 103-1 and a second sub-set of requests from the number of users to a second web server 103-N.

Although the present embodiment illustrates a single computing device 101 and two web servers (e.g., first web server 103-1 and second web server 103-N), embodiments in accordance with the present disclosure are not so limited. For instance, embodiments can include more than one computing device and fewer and/or more than two web servers.

In response to the query request, the number of web servers (e.g., the first web server 103-1 and the second web server 103-N, herein generally referred to as "the web server 103") can determine if data associated with the query is contained in the primary storage database 104 (e.g., a cache hit) and/or if cache associated with the query is expired or not. For instance, cache can be expired if data associated with the query has a cache expiration date that is expired and/or the query is marked (e.g., flagged) as stale (e.g., as discussed further herein).

In response to determining the cache is not expired, the web server 103 can read data associated with the query from the primary storage database 104 via one or more communication paths (e.g., communication path 116, 117) between the web server 103 and the primary storage database 104. The web server 103 can return the data to the user via a communication path between the computing device 101 associated with the user and the web server 103 (e.g., as discussed further below). The communication paths (e.g., communication path 110, 111, and 112) between the user and the web server 103 can include the same communication paths and/or different communication paths, in various embodiments.

In response to determining the cache is expired, the web server 103 can read data associated with the query from the database 108 (e.g., a database associated with a distributed application) using a communication path 114, 115 between the web server 103 and the database 108. Further, the web server 103 can send the data to the primary storage database 104 via a communication path 116, 117 between the web server 103 and the primary storage database 104. The primary storage database 104 can perform write operations to save the data received. The write operations can include, for instance, updating data in a cache store (e.g., refreshing the data in the primary storage database 104).

The updated data can be sent to the user via one or more communication paths from the web server 103 to the computing device 101 associated with the user (e.g., the communication path 111, 112 from the web server 103 to the load balancer 102 and the communication path 110 from the load balancer 102 to the computing device 101). The web server 103 can update a cache expiration date (e.g., an expiration timer) for the query. The update to the cache expiration date can, for instance, allow for the web server 103 to realize the data associated with the query is fresh in the cache store for future requests for the query (e.g., the data is recent until the updated cache expiration date expires). For instance, if a cache expiration date is updated from four hours to twenty-four hours for a query, the query is deemed fresh for a query request at six hours.

In addition, the updated data can be sent to the secondary storage database 106 from the primary storage database 104 via a communication path 118. The secondary storage database 106 can perform write operations to save the updated data. In various instances, the updated data can be sent to the user concurrently with the secondary storage database 106 performing write operations.

In various instances, data in the database 108 can be updated (e.g., changed or revised) by an application, a user and/or a service provider. For instance, the update can occur through the web server 103. Data updated in the database 108 can affect multiple queries.

For example, data A can be associated with query 1, query 2, . . . , query-P. In response to write operations against the database 108 that results in changes to data A, query 1, query 2, . . . query-P are stale in the primary storage database 104 (e.g., contain noncurrent data) and can be marked as stale by the web server 103. The stale queries can be refreshed by performing read operations against database 108 for the updated data and then performing write operations against the primary storage database 104 and/or the secondary storage database 106 with the updated data.

When cache is expired and/or otherwise stale, bytes are thereby written to both the primary storage database 104 and secondary storage database 106. However, in various situations, the primary storage database 104 and/or the secondary storage database 106 may have reached a database threshold. A database threshold, as used herein, can include, but is not limited to, a number of write pages per period of time (e.g., hour) that a storage database can perform. If a database threshold has been reached, a storage database may have performance issues such as malfunctions and/or may become inoperable.

Although the present embodiment of FIG. 1 illustrates a single primary storage database 104 and a single secondary storage database 106, embodiments in accordance with the present disclosure are not so limited. The primary storage database 104 can be contained on a first database server and the secondary storage database 106 can be contained on a second database server. The first database server and/or the second database server can contain a plurality of storage databases (e.g., a plurality of storage database instances).

In such an example, if a database threshold for the primary storage database 104 has been reached, a number of storage databases contained on the first database server may malfunction and/or become inoperable. Similarly, if a database threshold for the secondary storage database 106 has been reached, a number of storage databases contained on the second database server may malfunction and/or become inoperable.

To prevent and/or avoid performance issues, the web server 103 can be used to track attributes of a number of queries of the database 108. Attributes of a number of queries, as used herein, can include properties, characteristics, and/or features of the number of queries. The attributes can be collected over a period of time, such as a day, a week, a month, and/or a year, among other periods of time. The attributes of the number of queries can include data size of the query, information associated with re-caching data associated with the query (e.g., write page amount), logs of when the number of queries are received (e.g., time, day of a week, date), and/or whom requested the queries, among other attributes. That is, each query can have a history of the last time the query was requested (e.g., hit) and how often the query was requested.

The tracked attributes can, for instance, be used to identify historical trends of the number of received queries. The attributes can be analyzed to identify the historical trends. Historical trends, as used herein, can include identified patterns regarding the number of queries. Example historical trends can include a pattern of time queries are received, pattern of days queries are received, patterns when a database threshold is neared and/or reached (e.g., time of day, day of week, queries and/or distributed application involved), and/or patterns when (e.g., time and/or day of the week) an amount of queries received are low compared to other times and/or days of the week, among other historical trends.

In various embodiments, the historical trends can be used to revise a cache expiration date for at least one of a number of queries. For instance, based on the historical trends, one or more queries of the number of queries can be intelligently delayed for refreshing cache. The revision can be a temporary revision in response to a write operation against the database 108, in various instances. The revised cache expiration date can include, for instance, a different cache expiration date (e.g., time) then a default and/or user defined cache expiration date.

For instance, if query 1 is requested at 12:15 in the morning each day of the week, the cache expiration date for query 1 can be set to a threshold time prior to 12:15 in the morning (e.g., ten minutes, half-hour, and one hour prior to 12:15 a.m.) The threshold time can be identified, in various embodiments. For example, the threshold time can be identified based on the historical trends.

By revising the cache expiration date for query 1, the data associated with query 1 in the primary storage database 104 may not be the most current version of the data (e.g., it may be stale). If a user requests query 1 at a time prior to 12:15 in the morning, a web server 103, in various embodiments, can return updated data (e.g., fresh data) to the user from the database 108 (e.g., a database associated with a distributed application) and update the primary storage database 104 for query 1 and/or can return expired data from the primary storage database 104 if the database 108 is inoperable.

Using the above described example, the data associated with query 1 may be associated with a variety of queries. The data may have been updated, for instance, by a user and/or service provider (e.g., write operations against the database 108). That is, the update to the data contained on the database 108 may result in data associated with a variety of queries having stale (e.g., noncurrent data) in the primary storage database 104 and the secondary storage database 106. The variety of queries with stale data can be marked (e.g., flagged) stale. A query that is marked stale can be updated (e.g., refreshed) in the primary storage database 104 and the secondary storage database 106 intelligently (e.g., based on historical trends and/or tracked attributes), immediately, and/or upon the next request for the query by a user (e.g., the next user hit).

Intelligently updating stale and/or non-current data can have performance tradeoffs and delay write operations on the primary storage database 104 and the secondary storage database 106. For instance, an algorithm on the web server 103 can include an identification of data mapped to associated queries (e.g., updates to data X, Y, and Z causes queries 1-50 to be stale). When data is updated by a user and/or service provider, among other people, the data can be associated with a variety of queries (e.g., multiple queries) that are now stale and may need to be refreshed. The web server 103 can identify, using the algorithm, the variety of queries that are stale and can mark the variety of queries accordingly.

Revising a cache expiration date to delay write operations of a query can cause greater database reliability. For instance, revising a cache expiration date (e.g., marking queries stale) can cause cache write operations and replication to the primary storage database 104 and secondary storage database 106 for the variety of queries that are stale to be delayed while sending fresh data to the user from the database 108, however, the speed to return the data to the user is slower than using a storage database. The write operations associated with updating the queries can be balanced against keeping data updated in the primary storage database 104 using the tracked attributes to determine when to perform the write operations based on the database thresholds.

As an example, write operations (e.g., updates to data) against the database 108 (e.g., a database associated with a distributed application) can occur repetitively over time. Performing write operations against the primary storage database 104 and/or the secondary storage database 106 to keep data in the cache fresh can cause a database malfunction and/or inoperability due to the write operations exceeding a database threshold. For instance, one write operation to database 108 can cause eighteen queries (e.g., query results) to become stale. Using the tracked attributes, the web server 103 can determine when (e.g., time period) to refresh the data associated with the eighteen queries based on the database threshold of the primary storage database 104 and/or the secondary storage database 106.

Further, memory on the web server 103 can be utilized to store cache for data that may not be stored in a caching database due to performance rules and later backfill. Data for user can, thereby, stay fast and current, while preventing a storage database 104, 106 from becoming inoperable (e.g., being brought down).

Revising one or more cache expiration dates can include an optimization of the tradeoffs. For instance, the tradeoff can include a balance of speed of sending data to users (e.g., data in the primary storage database 104) and the number of write operations against the cache store (e.g., the primary storage database 104 and the secondary storage database 106). That is, the analytics can consider the size of a query, the amount of requests a particular query receives, how often data associated with the particular query is updated, whom requests the query (e.g., may assign an higher value to a query based on a particular user requesting the query, such as an important customer), what distributed application the query is associated with, and/or other attributes of the query. Thereby, the analytics can consider dynamically trading user response times required to pull data from database 108 for primary storage database 104 reliability based on the impact of the service provider's work (e.g., changes to data contained in the database 108) and which data users need most at the current time.

Further, in various embodiments, the environment 100 (e.g., the web server 103) can be used to prevent and/or avoid performance issues without tracking attributes over an extended period of time. For example, by utilizing query logs of the number of queries, it can be identified that a database threshold is reached and/or near being reached for a storage database (e.g., for replication and/or synchronization). In such an instance, a cache expiration date can be revised based on the size of data associated the number of queries of the database. That is, one or more queries (e.g., stale queries) can be identified as containing a larger amount of data than the remaining queries and can have their cache expiration date(s) revised. Alternatively and/or in addition, one or more queries can be randomly identified to have their cache expiration date revised.

Figure 2:
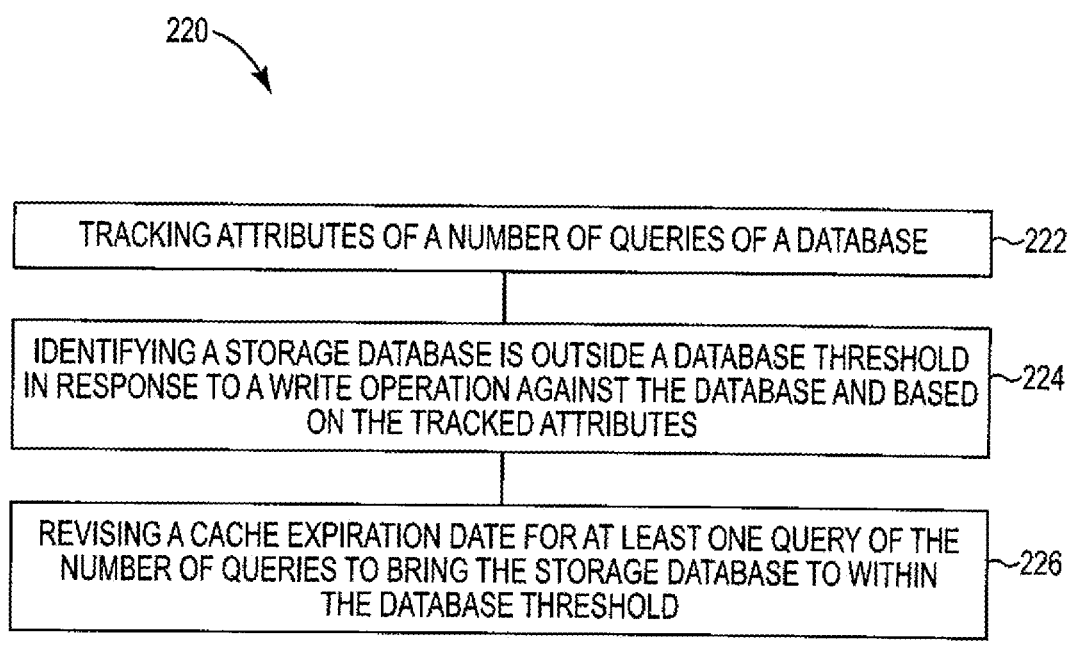
FIG. 2 illustrates a block diagram of an example of a method according to one or more embodiments of the present disclosure.

FIG. 2 illustrates a block diagram of an example of a method 220 according to one or more embodiments of the present disclosure. The method 220 can be used to intelligently revise cache expiration date(s) to prevent performance issues.

At block 222, the method 220 can include tracking attributes of a number of queries of a database. The database can contain data associated with a distributed application. A service provider and/or user may update (e.g., revise and/or change) data as insertions are made by the way of the distributed application.

The distributed application (e.g., a web service) can provide standardized data manipulation through the service provider's infrastructure (e.g., environment 100 illustrated in FIG. 1) including a thread pool data and cache store. The attributes tracked can include number of times a query was requested, who requested, time of day requested, day of the week requested, interval between requests, time data associated with the query is updated, and/or data size of the query, among other attributes.

At block 224, the method 220 can include identifying a storage database is outside a database threshold in response to a write operation against the database (e.g., database 108 as illustrated in FIG. 1) and based on the tracked attributes. The database, as used herein, can include a database associated with a distributed application (e.g., a CMDB). The write operation against the database can include a change and/or revision to data contained on the database by a user and/or the service provider, among other persons, and/or by an application.

A database threshold can include, but is not limited to, a number of write operations a database can perform in a period of time. For example, a database threshold can include a variety of database metrics indicating stress to a database and/or storage database.

As an example, in response to write operations against the database (e.g., database 108), a number of queries can be marked stale by the web server (e.g., web server 103 as illustrated in FIG. 1). A query marked as stale can include a query containing noncurrent data. The write operations to refresh the stale queries in the primary storage database (e.g., primary storage database 104 as illustrated in FIG. 1) and to replicate data to the secondary storage database (e.g., secondary storage database 106 as illustrated in FIG. 1) may bring the primary storage database and/or the secondary storage database outside a database threshold. The webserver (e.g., web server 103) can make such a determination, for instance, based on the tracked attributes and/or identified historical trends.

In various instances, the database threshold can include a range of values including one or more values below the number of write operations per a period of time (e.g., an hour) the database can perform. In such an instance, a storage database can be outside a database threshold prior to the database maximum performance capability and can avoid performance issues from arising due to write operations at peak usage times. The identification can, for instance, be based on queried log histories from the database (e.g., the database 108 storing data of the distributed application).

At 226, the method 220 can include revising a cache expiration date for at least one query of the number of queries to bring the storage database to within the database threshold. For instance, the storage database can include a primary storage database (e.g., primary storage database 104 as illustrated in FIG. 1) and/or a secondary storage database (e.g., secondary storage database 106 as illustrated in FIG. 1).

The revised cache expiration date can include a temporary revision of a cache expiration date for one or more queries based on tracked attributes and/or historical trends. The queries can include queries that are marked stale in response to an update to data in the database (e.g., database 108 as illustrated in FIG. 1). Example revised cache expiration dates can include zero (e.g., update immediately), none (e.g., update on the next user hit), and/or a particular value based on historical trends (e.g., move from six hours to twenty-four hours, 12 a.m., Friday at 12 a.m.). In some embodiments, the cache expiration date can go back to a default value (e.g., the cache expiration date prior to being revised) once the data has been refreshed based on the revised cache expiration date.

In various instances, the database threshold can be associated with write operations for replication of data from the database (e.g., database 108 as illustrated in FIG. 1) to the primary storage database (e.g., primary storage database 104) to refresh data. Alternatively and/or in addition, the database threshold can be associated with write operations for replicating and/or mirroring data over a communication path (e.g., communication path 118 as illustrated in FIG. 1) from the primary storage database (e.g., primary storage database 104) to the secondary storage database (e.g., secondary storage database 106) to synchronize the secondary storage database. The secondary storage database (e.g., secondary storage database 106), in some instances, can be located in an offline data recovery center. The database threshold can be received and/or retrieved, for instance, from the primary storage database (e.g., primary storage database 104) and/or the secondary storage database (e.g., secondary storage database 106).

Revising a cache expiration date, as used herein, can include adjusting a time to update data in a cache store (e.g., the primary storage database). The updated data can include, for instance, data associated with the query. The revised cache expiration date can be, for instance, based on the historical trends. For example, the time can be adjusted to a time when write operations are below a threshold amount (e.g., a low usage and/or write operation based on the historical trends), to a time prior to an identified pattern for the query to be requested (e.g., query 1 is requested at 1 p.m.), to a time after to an identified pattern for data associated with the query to be updated (e.g., query 1 has data updated at 3 p.m. each day of the week), patterns of stale data (e.g., query 1 has stale data, so force the re-caching at next request for query 1), among many other adjustments. The revision, in various instances, can be automatic (e.g., without human intervention).

In some examples, the one or more queries with a revised cache expiration date can be identified to be revised based on the data size of the one or more queries. For instance, if a distributed application includes twelve queries (e.g., stale queries) and one of the twelve, query 1, is larger than the remaining eleven then query 1 can have a cache expiration date revised to keep the storage database below a database threshold.

In accordance with some embodiments of the present disclosure, the method 220 can include identifying historical trends of the number of received queries using the attributes. For instance, historical trends can be identified by analyzing the attributes collected over a period of time. Based on identified patterns of particular queries (e.g., query 1 is requested at 1 p.m., query 2 is requested once an hour, query 3 is requested every five minutes, etc.), patterns of the number of queries (e.g., the number of queries have a low request volume at 10 p.m. compared to a request volume at 8 p.m.), patterns of updated data associated with the query (e.g., query 1 has data updated once a day, query 2 has data updated once an hour, query 3 has data updated once a half hour), re-caching actions associated with queries (e.g., re-caching for query 1 is an average volume of 100 megabytes (MB), re-caching for query 2 is an average volume of 25

MB, and re-caching for query 3 is 5 MB), and/or identified anomalies (e.g., high volume every last day of the month), one or more of the number of queries can have a cache expiration date revised to intelligently re-cache data.

Intelligently revising a cache expiration date for one or more queries can assist in providing evergreen, near real-time data while maintaining high availability in an environment (e.g., infrastructure). Analyzing historical trends can allow for a proactive response to a database threshold being reached and/or potentially being reached. For instance, rather than waiting for an administrator to respond to an alert and/or a storage database and/or database server going offline in response to a database threshold being reached, in various embodiments, a web server can revise cache expiration dates of queries based on attributes of the queries (e.g., write operations when re-cached, write operation for replication to secondary storage database, size of the query, etc.). The intelligent revision can include optimizing a balance between speed of sending data to users (e.g., data prepared ahead of time in a cache store is faster than getting data from the database) and the number of write operations against the cache store (e.g., to write the re-cache to the primary storage database and write replicated data to the secondary storage database).

FIGS. 3A-3B illustrates an example of a display 330, 340 on a user interface according to one or more embodiments of the present disclosure. The displays 330, 340 illustrated by FIGS. 3A-3B can be accessed and/or displayed through a management user interface. The management user interface can include a user interface associated with a distributed application to manage queries.

A user interface can, for example, include a space where interactions between a user and a computing device occur (e.g., allows a user to interact with a computing device using images and/or text). A user interface can include hardware components and computer instruction components. For instance, hardware components can include input components (e.g., a mouse, a touch screen, and a keyboard) and output components for the computing device to indicate the effects of user input (e.g., display). An example user interface can include a graphical user interface (GUI). A GUI can, for example, represent actions and tasks available to a user through graphical icons and visual indicators. A display, as used herein, can include a screen and/or a touch screen, for example.

FIG. 3A illustrates a display 330 on a user interface illustrating a graphical representation of queries and associated cache expiration dates 336. Each query can, for instance, include a query name 332, an identification of traffic per day 334 associated with the query, and a cache expiration date 336. The cache expiration date 336 can be revised automatically based on historical trends and/or identified database threshold breaches and/or by a user.

The revision can be from, for instance, a default cache expiration date, a user defined cache expiration date, and/or a previously revised cache expiration date (e.g., a cache expiration date revised based on tracked attributes can be further revised based on updated historical trends and/or tracked attributes). For example, a user can initially set the cache expiration date 336 using the user interface. As illustrated in FIG. 3A, the user can set the cache expiration date 336 using a drop down box 338 containing a list of options (e.g., disabled, 1 hour, 4 hours, 1 day, 3 days, and 1 week). Alternatively and/or in addition, the user can enter the expiration date using an input device (e.g., a mouse, a keyboard, a touch screen).

Although the present embodiment of FIG. 3A illustrates a drop down box 338 for a user to set a cache expiration date, embodiments in accordance with the present disclosure are not so limited. For example, a user can enter a value using an input device and/or a default value can be used, among other ways to set a cache expiration date FIG. 3B illustrates a display 340 on a user interface illustrating a graphical representation of attributes of a number of queries. The display 340 can include graphical representation of a name of a query 342, a cache expiration date for data associated with the query 344, and identification of data associated with the query 346 (e.g., query results). Although the present display 340 illustrated by FIG. 3B illustrates a query name, cache expiration date, and identified data, embodiments are not so limited and a variety of attributes can be displayed (e.g., whom requested the query, when it was requested, data size, etc.).

As illustrated by FIG. 3B, each query can be associated with data 346. The data associated with a query can include query results, for instance, to track attributes of the number of queries. In various embodiments, data in the database can be mapped to each query to identify data associated with each query. Such mapping can assist, for instance, in tracking re-caching trends associated with each query (e.g., when is data updated and/or how much data is involved in the re-cache).

Figure 4:
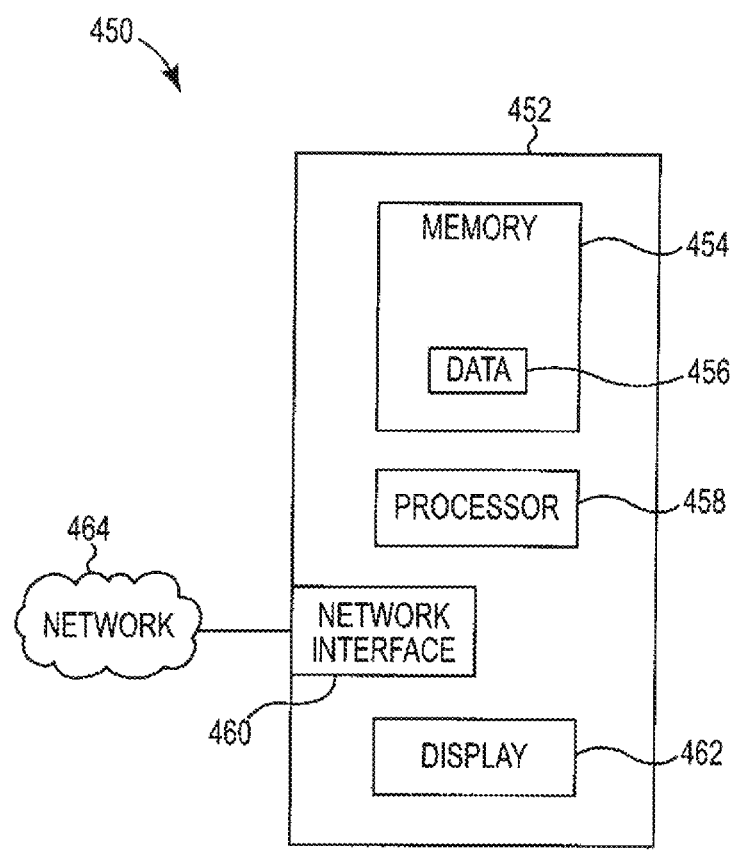
FIG. 4 illustrates a block diagram of an example of a computing system according to one or more embodiments of the present disclosure.

FIG. 4 illustrates a block diagram of an example of a computing system 450 according to one or more embodiments of the present disclosure. The computing system 450 can be utilized with one or more embodiments of the present disclosure. The computing system 450 can include a computing device 452 (e.g., a web server 103, as illustrated in FIG. 1). The computing device 452 can be, for example, a laptop computer and/or a desktop computer, among other types of computing devices.

The computing device 452 can include a memory 454 and a processor 458 coupled to memory 454. For example, the memory 454 can include various types of information including data 456 and executable instructions, as discussed herein. Memory 454 can be any type of storage Medium that can be accessed by processor 458 to perform various examples of the present disclosure (e.g., collect data including attributes of a number of queries of a database over a period of time, identify historical trends of the number of received queries using the collected data, etc.) For example, memory 454 can be a non-transitory computing device readable medium having computing device readable instructions (e.g., computing device program instructions, machine readable instructions, computer readable instructions, etc.) and data 456 stored thereon. The computing device readable instructions are executable by processor 458 to perform various examples of the present disclosure. The data 456 can be used (e.g., analyzed by) the computing device readable instructions during their execution.

Memory 454 can be volatile or nonvolatile memory. Memory 454 can also be removable (e.g., portable) memory, or non-removable (e.g., internal) memory. For example, memory 454 can be random access memory (RAM) (e.g., dynamic random access memory (DRAM) and/or phase change random access memory (PCRAM), read-only memory (ROM) (e.g., electrically erasable programmable read-only memory (EEPROM) and/or compact-disc read-only memory (CD-ROM), flash memory, a laser disc, a digital versatile disc (DVD) or other optical disk storage, and/or a magnetic medium such as magnetic cassettes, tapes, or disks, among other types of memory.

Further, although memory 454 is illustrated as being located in computing device 452, embodiments of the present disclosure are not so limited. For example, memory 454 can, in addition to or alternatively, be located internal to another computing resource (e.g., enabling computer readable instructions to be downloaded over the Internet or another wired or wireless connection).

The computing device 452 can include a network interface 460. Network interface 460 can connect the computing device 452 to a network, such as network 464 illustrated in FIG. 4.

Network 464 can be a wired or wireless network, such as, for instance, a wide area network (WAN) such as the Internet, a local, area network (LAN), a personal area network (PAN), a campus area network (CAN), or metropolitan area network (MAN), among other types of networks: As used herein, a "network" (e.g., network 464) can provide a communication system that directly or indirectly links two or more computers and/or peripheral devices and allows users to access resources on other computing resources (e.g., computing devices and/or data storage devices) and/or exchange messages with other users.

A network can allow users to share resources on their own systems with other network users and to access information on centrally located systems or on systems that are located at remote locations. For example, network 464 can tie a number of computing devices together to form a distributed control network (e.g., permit a computing device to connect to a repository of multimedia files hosted and/or uploaded to a central server by other computing devices accessing the network).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network. For instance, the network 464 can be used to connect and/or communicate between devices and/or applications of a system, such as illustrated in the embodiment of FIG. 1 (e.g., environment 100).

The computing device 452 can also include a display 462. Display 462 can include, for example, a screen that can provide (e.g., display and/or present) information to a user of computing device 452.

Additionally, computing device 452 can receive information from the user of computing device 452 through an interaction with the user via display 462. For example, computing device 452 can receive input from the user via display 462 (e.g., a touch screen display or via another user input device such as a keyboard in response to interaction with items show on the display). For example, the user can enter the input into computing device 452 using, for instance, a mouse and/or keyboard associated with computing device 452 (e.g., display 462). For instance, a user can enter input to cause the computing device 452 to create a report. The report can, for example, be shown on the display 462.

In one or more embodiments, the processor 458, in association with memory 454, can be associated with data 456 and/or application modules (e.g., not shown in FIG. 4). The processor 458, in association with the memory 454, can store and/or utilize data and/or execute instructions to revise a cache expiration date for at least one query of the number of queries based on an identified historical trend and a database threshold.

As used herein, a module can be a stand alone program or portion of a program or can be a set of code that provides a particular functionality and may not be stand alone and may not even include instructions interspersed within a set of code. Such application modules can include collect data module, historical trends module, database threshold module, and/or revise cache module.

A collect data module can, for example, be configured to collect data including attributes of a number of queries of a database over a period of time. The database can include a database associated with a distributed application (e.g., a CMDB). The collected data can include attributes of the number of queries, data associated with the primary storage database and/or secondary storage database, network information, and/or data related to updates to data in the database (e.g., when does the service provider update data and which queries are impacted), among other data.

A historical trends module can be configured to identify historical trends of the number of received queries using the collected data. The historical trends can include, for instance, identified patterns associated with the number of queries (e.g., pattern of a particular query, patterns of the number of queries, patterns of re-caching data, patterns of updating data associated with the queries, etc.)

A database threshold module can, for example, be configured to identify a storage database is outside a database threshold in response to a write operation against the database (e.g., a database associated with a distributed application) and based on the collected data. The identification can, for instance, include a determination that the database threshold is likely (e.g., will be) to be reached based on the historical trends (e.g., based on the historical trends, a database threshold may be reach in a future time). Alternatively and/or in addition, the identification can include that a database threshold is reached in a current time.

A revise cache VM module can be configured to automatically revise a cache expiration date for at least one query of the number of queries based on the identified historical trends and the database threshold. In such instances, the revision can include an intelligent re-caching based on attributes of the number of queries and the database threshold to bring the database (e.g., the storage database) to within the database threshold (e.g., below a number of write pages per hour, among other database metrics).

Revising a cache expiration date for one or more queries can, for instance, delay write operations against a primary storage database and/or a secondary storage database. A revised cache expiration date can, for instance, result in stale data contained on the primary storage database and/or the secondary storage database and/or fresh data can be retrieved from the database in response to a query request from a user (e.g., resulting in a longer time to deliver the data to the user than if the data were contained in a cache store). An algorithm that compensates for temporary overload backend (e.g., the primary storage database and/or the secondary storage database reaching a database threshold) can be revised using the historical trends, for instance.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense. As used herein, "a" or "a number of" used in referring to a particular thing is intended refer to one or more such things.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, if provided, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, inventive subject matter lies in less than all features of a single disclosed embodiment. Thus, the claims, if provided, are hereby incorporated into the Detailed Description, with each claim standing on its own as a separate embodiment.

What is claimed:

1. A computer-implemented method comprising:
    tracking attributes of a plurality of queries of a storage database, wherein the attributes include a size of data associated with each of the plurality of queries;
    identifying a number of write operations for updating data stored in a storage database;
    determining that the number of write operations exceeds a database threshold;
    identifying, among the plurality of queries, a query that is associated with the largest size of data based on the tracked attributes; and
    setting a cache expiration date for the identified query to bring the number of write operations to within the database threshold.

2. The method of claim 1, wherein the database threshold indicates a number of write operations that the storage database can perform in a period of time.

3. The method of claim 1, wherein identifying the number of write operations for updating data stored in a storage database comprises: identifying the number of write operations for updating data stored in a primary storage database and for replicating data from the primary storage database to a secondary storage database.

4. The method of claim 3, wherein determining that the number of write operations exceeds the database threshold comprises:
    determining that a number of write pages per hour of at least one of the primary storage database and the secondary storage database is greater than the database threshold of at least one of the primary storage database and the secondary storage database.

5. The method of claim 1, wherein tracking attributes of the plurality of queries of a database comprises analyzing historical trends of re-caching data associated with the plurality of queries.

6. The method of claim 1, wherein tracking attributes comprises tracking at least one of a time, day of a week, or a date when the number of queries of the database are received.

7. A non-transitory computer-readable medium storing a set of instructions that, when executed by at least one processor, cause the at least one processor to perform operations comprising:
    tracking attributes of a plurality of queries of a storage database, wherein the attributes include a size of data associated with each of the plurality of queries;
    identifying a number of write operations for updating data stored in a storage database;
    determining that the number of write operations exceeds a database threshold;
    identifying, among the plurality of queries, a query that is associated with the largest size of data based on the tracked attributes; and
    setting a cache expiration date for the identified query to bring the number of write operations to within the database threshold.

8. The non-transitory computer-readable medium of claim 7, wherein the database threshold indicates a number of write operations that the storage database can perform in a period of time.

9. The non-transitory computer-readable medium of claim 7, wherein the operations further comprise: identifying at least one of a pattern of time or a pattern of day that one or more queries of the plurality of queries are received.

10. The non-transitory computer-readable medium of claim 7, wherein the operations further comprise: identifying a pattern of time or a pattern of day when an amount of received queries is low as compared to at least one of other times or days of the week.

11. The non-transitory computer-readable medium of claim 7, wherein setting the cache expiration date for the identified query comprises: adjusting a time to update data in a cache store, wherein the updated data includes data that is associated with the identified query.

12. A system comprising at least one processor in communication with a non-transitory computer readable medium, wherein the non-transitory computer readable medium includes a set of instructions which, when executed by the at least one processor, cause the at least one processor to perform operations comprising:
    tracking attributes of a plurality of queries of a storage database, wherein the attributes include a size of data associated with each of the plurality of queries;
    identifying a number of write operations for updating data stored in a storage database;
    determining that the number of write operations exceeds a database threshold;
    identifying, among the plurality of queries, a query that is associated with the largest size of data based on the tracked attributes; and
    setting a cache expiration date for the identified query to bring the number of write operations to within the database threshold.

13. The system of claim 12, wherein determining that the number of write operations exceeds the database threshold comprises: determining that the number of write operations will exceed the database threshold in a future time.

14. The system of claim 12, wherein the operations comprise: mapping data of the storage database to associated queries of the plurality of queries.

15. The system of claim 12, wherein the operations comprise: marking at least one query of the plurality of queries as stale.

16. The system of claim 12, wherein the operation comprises: adjusting an algorithm that compensates for a temporary backend overload based on the tracked attributes.

17. The system of claim 12, wherein identifying the number of write operations for updating data stored in a storage database comprises: identifying the number of write operations for updating data stored in a primary storage database and for replicating data from the primary storage database to a secondary storage database.

18. The system of claim 12, wherein determining that the number of write operations exceeds the database threshold comprises: determining that a number of write pages per hour of at least one of the primary storage database and the secondary storage database is greater than the database threshold of at least one of the primary storage database and the secondary storage database.

19. The system of claim 12, wherein tracking attributes of the plurality of queries of the database comprises analyzing historical trends of re-caching data associated with the plurality of queries.

20. The system of claim 12, wherein setting the cache expiration date for the identified query comprises: adjusting a time to update data in a cache store, wherein the updated data includes data that is associated with the identified query.

* * * * *